(12) United States Patent
Graupner

(10) Patent No.: US 6,290,237 B1
(45) Date of Patent: Sep. 18, 2001

(54) FLAT RING PACKING

(75) Inventor: Edgar Graupner, Annaberg-Buchholz (DE)

(73) Assignee: IDT Industrie-und Dichtungstechnik GmbH, Essen (DE)

( * ) Notice: Subject to any disclaimer, the term of this patent is extended or adjusted under 35 U.S.C. 154(b) by 0 days.

(21) Appl. No.: 09/357,053

(22) Filed: Jul. 19, 1999

(30) Foreign Application Priority Data

Jul. 21, 1998 (DE) .......................................... 298 12 929 U

(51) Int. Cl.[7] ............................................. F16L 21/05
(52) U.S. Cl. ........................ 277/603; 277/609; 277/627; 277/654; 285/910; 285/917
(58) Field of Search ................................. 277/603, 609, 277/627, 614, 654, 592, 946, 925; 285/328, 379, 917, 910

(56) References Cited

U.S. PATENT DOCUMENTS

| 1,747,929 | * | 2/1930 | Cook | 277/923 |
|---|---|---|---|---|
| 1,968,365 | * | 7/1934 | Bailey | 428/133 |
| 2,006,381 | * | 7/1935 | Bailey | 428/133 |
| 2,462,762 | * | 2/1949 | Nardin | 277/609 |
| 2,992,843 | * | 7/1961 | Smith | 277/925 |
| 3,573,873 | * | 4/1971 | Pearson | 277/610 |
| 3,747,963 | * | 7/1973 | Shivak | 285/336 |
| 4,095,809 | * | 6/1978 | Smith | 277/611 |
| 4,415,166 | * | 11/1983 | Beia | 277/925 |
| 4,810,832 | * | 3/1989 | Spinner et al. | 174/65 SS |
| 5,511,797 | * | 4/1996 | Nikirk et al. | 277/610 |
| 5,823,542 | * | 10/1998 | Owen | 277/603 |
| 6,089,618 | * | 7/2000 | Cook | 285/293.1 |

* cited by examiner

Primary Examiner—Anthony Knight
Assistant Examiner—Alison K. Pickard
(74) Attorney, Agent, or Firm—Michael Best & Friedric LL; J. Warren Whitesel

(57) ABSTRACT

A flat ring packing to be placed between two flanges comprises two packing layers of packing material and an intermediate ring of metal, which is disposed between the two packing layers and has a common central longitudinal axis therewith. Each packing layer is fixed on the intermediate ring substantially without play radial and parallel to the axis by means of a connection.

5 Claims, 1 Drawing Sheet

FLAT RING PACKING

BACKGROUND OF THE INVENTION

1. Field of the Invention

The invention relates to a flat ring packing to be placed between two flanges and comprising two packing layers of packing material and an intermediate ring of metal which is disposed between the two packing layers and has a common central longitudinal axis therewith.

2. Background Art

Flat ring packings of the generic type are used for instance in pharmaceutical and foodstuff industry. In this case, a prerequisite resides in that the flanged joints do not exhibit any so-called wake spaces, i.e. spaces of poor flow. This is why the flat ring packings on the one hand and the pipes and apparatuses which the flanges are mounted on are to have identical inside diameters.

In known flat ring packings provision is made for an intermediate ring which is inserted into a sleeve of packing material. This one-piece sleeve forms packing layers which are joined to each other undivided in the radially inner area. In this case, radial play and also axial play must be available between the intermediate ring and the sleeve which comprises the packing layers in order that any tearing of buckling of this sleeve during assembly be avoided. It is difficult to center the sleeve of packing material and the intermediate ring of metal between the to-be-connected flanges in such a way that no wake spaces will form relative to the pipes.

SUMMARY OF THE INVENTION

It is an object of the invention to embody a flat ring packing of the generic type such that the packing layers and the intermediate ring are accurately centered relative to each other.

According to the invention, this object is attained in that each packing layer is fixed on the intermediate ring substantially without play radial and parallel to the axis by means of a connection. This design helps achieve that any displacement of the packing layers relative to the intermediate ring in the radial direction is precluded. In this way no wake spaces can form on the flanged joints. The layers can be mounted in the way of a snap connection on the intermediate ring and can again be released therefrom and replaced by fresh ones. The kind of connection of the packing layers to the intermediate ring ensures that there are no materials such as glue which might be passed on to the media flowing in the pipes. The flat ring packing consists exclusively of the two packing layers and the intermediate ring.

Numerous advantageous embodiments will become apparent from the ensuing description of an exemplary embodiment, taken in conjunction with the drawing.

DESCRIPTION OF THE PREFERRED EMBODIMENT

Figure 1:
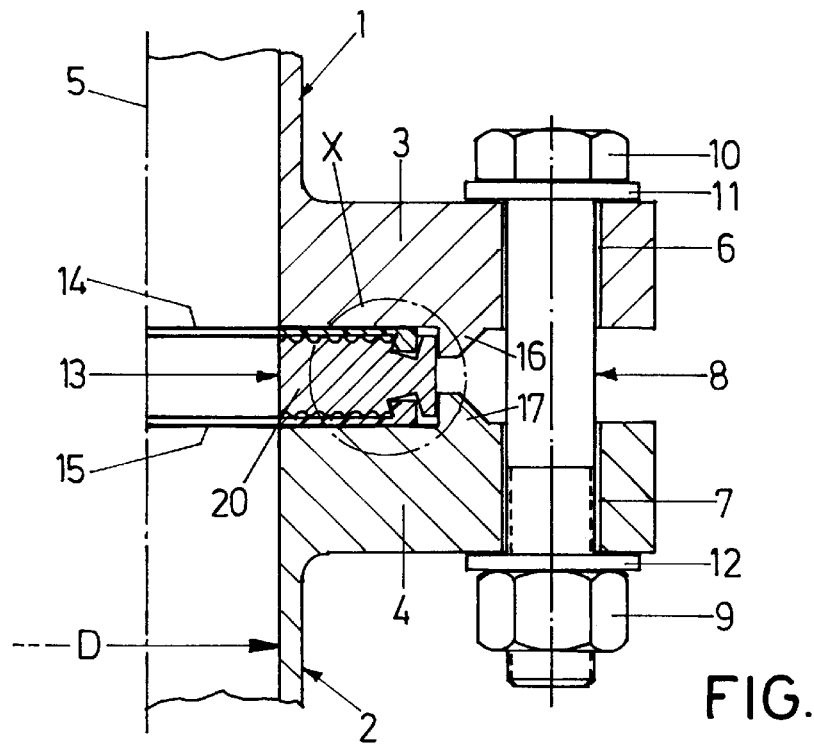
FIG. 1 is a cross-sectional view of a flanged joint with a flat ring packing according to the invention.
Figure 2:
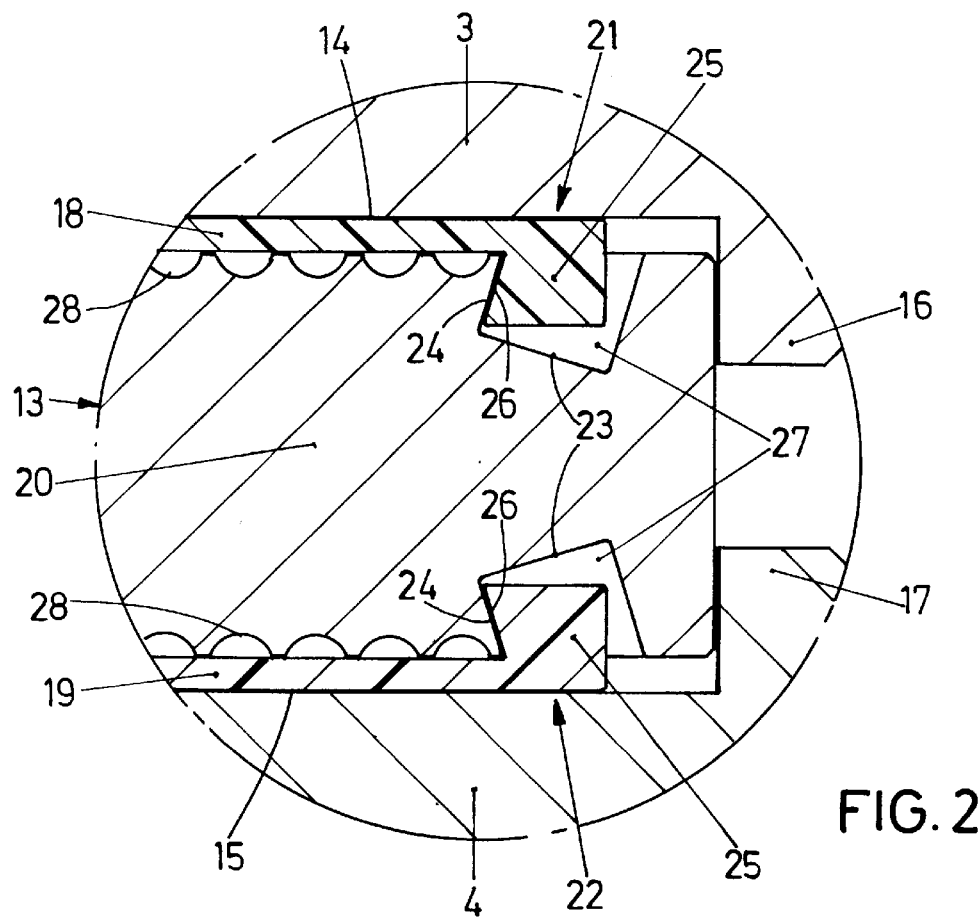
FIG. 2 is an illustration of the portion X in FIG. 1 on an enlarged scale.

FIG. 1 illustrates a flanged joint of two pipes 1, 2, the ends of which turned toward each other are provided with a flange 3 and 4. The flanges comprise drilled holes 6, 7 which are in alignment concentrically of the central longitudinal axis 5 of the pipes 1, 2 and of which only one pair is illustrated. The flanges 3, 4 and thus the pipes 1, 2 are tightly joined to each other through these drilled holes 6, 7 by means of screws 8 and nuts 9, a washer 11 and 12, respectively, being placed between the head 10 of the screw 8 and the adjacent flange 3 and between the nut 9 and the adjacent flange 4. A flat ring packing 13, which is illustrated on an enlarged scale in FIG. 2, is disposed between the flanges 3, 4. The inside diameters D of the pipes 1, 2 and of the packing 13 are identical.

The flanges 3, 4 have an annular packing surface 14, 15, against which bears the flat ring packing 13. The flanges 3, 4 may additionally have annular ribs 16, 17 which encircle between these packing surfaces 14, 15 and the drilled holes 6, 7 and which serve to center the flat ring packing 13 relative to the axis 5, i.e. against which the flat ring packing 13 bears radially.

As seen in FIG. 2, the flat ring packing 13 comprises two packing layers 18, 19 and an approximately cylindrical intermediate ring 20 disposed therebetween, i.e. it has a sandwich design. The packing layers 18, 19 consist of PTFE (polytetrafluoroethylene) as an elastically deformable and consequently flexible packing material. The packing layers 18, 19 are joined to the intermediate ring 20 by means of connections 21, 22 which are mirror-inverted relative to each other. Each connection 21 and 22 comprises a recess 23 in the intermediate ring 20, the recess 23 encircling concentrically of the axis 5 and comprising a rear recess which is formed by a locking surface 24 in the shape of a truncated cone tapering in a direction away from the respective packing layer 18 and 19 towards the inside of the intermediate ring 20. In the vicinity of its periphery, the respective packing layer 18 and 19 comprises a locking rib 25 which encircles concentrically of the axis 5 and engages with the corresponding recess 23 and which is also rear-recessed such that its inner surface turned toward the axis 5 constitutes an opposite surface 26 in the shape of a truncated cone which rests on the locking surface 24 tightly and without play over the full surface.

As further seen in FIG. 2, the recesses 23 comprise an annularly encircling clearance 27 radially outside the locking rib 25 and underneath the locking rib 25 in the direction of the axis 5. A suitable tool may be inserted into this clearance 27; it reaches under the locking rib 25, lifting same from the locking surface 24 and forcing it out of the recess 23. In this way, the packing layers 18, 19 are detachable from the intermediate ring 20 and can be replaced. Since the opposite surface 26 of the respective locking rib 25 rests tightly on the locking surface 24 of the respective recess 23, the respective packing layer 18 and 19 is centered accurately relative to the intermediate ring 20. Since furtheron the packing 13 as a whole, i.e. the layers 18, 19 and the intermediate ring 20, have identical inside diameters D, no wake spaces can arise. Since the material of the packing layers 18 and 19 is elastically deformable, the locking ribs 25 can be snapped into place by elastic deformation. Fixing the packing layers 18, 19 on the intermediate ring 20 takes place in the way of a snap connection.

The frontal surfaces of the intermediate ring 20, which the packing layers 18, 19 rest on, are provided with a profile in the shape of grooves 28 of a cross-section in the form of a segment of a circle and which run concentrically of the axis 5 and into which the packing layers 18, 19 are pressed partially upon clamping of the flanges 3, 4.

What is claimed is:

1. A flat ring packing to be placed between two parallel flanges (3, 4), comprising two packing layers (18, 19) made of packing material; and an intermediate metal ring (20) disposed between the two packing layers (18, 19), said intermediate ring having a common central longitudinal axis (5) and which has an inside surface, wherein each packing layer (18, 19) is fixed on the intermediate ring (20) substantially without radial and parallel play about the axis (5), said fixing being by means of a connection (21, 22), and wherein each connection (21, 22) comprises a recess (23) in the intermediate ring (20), said recess (23) being concentric to the axis (5) and has a locking surface (24), and a locking rib (25), which is formed on each packing layer (18, 19) and which engages the recess (23) and which has an opposite surface (26) resting on the locking surface (24), the recess (23) comprising a clearance (27) which is radial to said central longitudinal axis (5), said clearance being outside the locking rib (25) and oriented toward the inside of the intermediate ring (20).

2. A flat ring packing according to claim 1, wherein the locking surface (24) and the opposite surface (26) have the shape of a truncated cone and taper towards the inside of the intermediate ring (20).

3. A flat ring packing according to claim 1, wherein the intermediate ring (20) comprises a profile (28) on at least one frontal surface turned toward a packing layer (18, 19).

4. A flat ring packing according to claim 1, wherein said packing layers (18, 19) consist of PTFE as the packing material.

5. A flat ring packing according to claim 1, wherein a packing structure is formed exclusively by said two packing layers (18, 19) and said intermediate ring (20) of metal.

* * * * *